United States Patent
Ahn

(10) Patent No.: US 9,818,992 B2
(45) Date of Patent: Nov. 14, 2017

(54) BATTERY PACK

(71) Applicant: Samsung SDI Co., Ltd., Yongin-si, Gyeonggi-do (KR)

(72) Inventor: Soomin Ahn, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 243 days.

(21) Appl. No.: 14/197,193

(22) Filed: Mar. 4, 2014

(65) Prior Publication Data
US 2015/0118529 A1 Apr. 30, 2015

(30) Foreign Application Priority Data
Oct. 25, 2013 (KR) .......................... 10-2013-0127530

(51) Int. Cl.
| | |
|---|---|
| *H01M 2/00* | (2006.01) |
| *H01M 2/10* | (2006.01) |
| *H01M 10/613* | (2014.01) |
| *H01M 10/6562* | (2014.01) |

(52) U.S. Cl.
CPC ......... *H01M 2/1016* (2013.01); *H01M 2/105* (2013.01); *H01M 2/1072* (2013.01); *H01M 10/613* (2015.04); *H01M 10/6562* (2015.04); *H01M 2220/20* (2013.01); *H01M 2220/30* (2013.01)

(58) Field of Classification Search
CPC ....................................................... H01M 2/00
See application file for complete search history.

(56) References Cited

U.S. PATENT DOCUMENTS

| | | | |
|---|---|---|---|
| 2001/0046624 A1 | 11/2001 | Goto et al. | |
| 2009/0087727 A1* | 4/2009 | Harada | ............... H01M 2/1077 429/120 |
| 2011/0039142 A1* | 2/2011 | Kwag | ................... H01M 2/105 429/99 |
| 2013/0011719 A1* | 1/2013 | Yasui | ................... H01M 2/0245 429/159 |

FOREIGN PATENT DOCUMENTS

| | | |
|---|---|---|
| JP | 2001-325996 A | 11/2001 |
| KR | 2003-0024276 A | 3/2003 |
| KR | 10-2011-0016820 A | 2/2011 |

* cited by examiner

*Primary Examiner* — Jacob Marks
(74) *Attorney, Agent, or Firm* — Lewis Roca Rothgerber Christie LLP

(57) ABSTRACT

A battery pack includes a plurality of battery cells, each of the battery cells extending in a lengthwise direction between a first end and a second end; and a battery case accommodating the plurality of battery cells, wherein the battery case includes a holder unit protruding in the lengthwise direction of the plurality of battery cells and fixing the plurality of battery cells within the case.

16 Claims, 4 Drawing Sheets

BATTERY PACK

CROSS-REFERENCE TO RELATED APPLICATION

This application claims priority to and the benefit of Korean Patent Application No. 10-2013-0127530, filed on Oct. 25, 2013, the entire content of which is incorporated herein by reference.

BACKGROUND

1. Field

Aspects of the present invention relate to a battery pack.

2. Description of the Related Art

In general, a single battery cell is not sufficient to be used as power source of a high-power consuming electric device such as a notebook computer, an electronic tool, an electric bicycle, or an electric scooter. Therefore, a battery pack including a plurality of battery cells connected in series and in parallel may be used as a power source of such an electric device or electronic tool.

Because a plurality of battery cells are connected to constitute a battery pack, a holder case for fixing the plurality of battery cells can be further provided inside a case of the battery pack. In order to ensure battery safety and improved performance, it is desirable for a battery pack to be configured to easily emit heat generated when the plurality of battery cells are repeatedly charged and discharged.

SUMMARY

Embodiments of the present invention provide a battery pack which includes air passageways in a holder unit integrated with a battery case to allow external air to move, thereby efficiently cooling battery cells accommodated in a battery case.

In accordance with one aspect of the present invention, there is provided a battery pack including a plurality of battery cells, and a battery case accommodating the plurality of battery cells, wherein the battery case includes a holder unit protruding in a lengthwise direction of the plurality of battery cells and fixing the plurality of battery cells.

The battery case may include a first battery case surrounding one side of the lengthwise direction of each of the plurality of battery cells, and a second battery case surrounding the other side opposite to the one side of the lengthwise direction of each of the plurality of battery cells and combined with the first battery case.

The holder unit may include a first holder unit protruding from the first battery case to the other side of the lengthwise direction of each of the plurality of battery cells, and a second holder unit protruding from the second battery case to one side of the lengthwise direction of each of the plurality of battery cells.

The first holder unit and the second holder unit may be shaped of a pipe having an air passageway.

The battery pack may further include a thermally conductive pipe surrounding the first holder unit and the second holder unit.

An end of the first holder unit and an end of the second holder unit may make contact with each other.

An end of the first holder unit and an end of the second holder unit may be spaced apart from each other, so that the thermally conductive pipe is exposed to the outside of the battery case.

The thermally conductive pipe may be an aluminum pipe having high heat conductivity.

The thermally conductive pipe may make contact with adjacent battery cells among the plurality of battery cells.

The plurality of battery cells may be arranged within the battery case in two rows.

The holder unit may protrude to crossing portions of 4 adjacent battery cells among the plurality of battery cells.

The holder unit may make contact with lateral surfaces of 4 adjacent battery cells.

The holder unit may be shaped of a circular pipe having an air passageway and is integrally formed with the battery case.

The battery pack may further include electrode tabs accommodated within the battery case and connecting the plurality of battery cells in series.

As described above, according to embodiments of the present invention, since the battery pack includes air passageways in a holder unit integrated with a battery case to allow external air to move, battery cells accommodated in a battery case can be efficiently cooled.

Additional aspects and/or advantages of the invention will be set forth in part in the description which follows or will be apparent from the description.

BRIEF DESCRIPTION OF THE DRAWINGS

The objects, features and advantages of the present invention will be more apparent from the following detailed description in conjunction with the accompanying drawings, in which.

DETAILED DESCRIPTION

Figure 1:
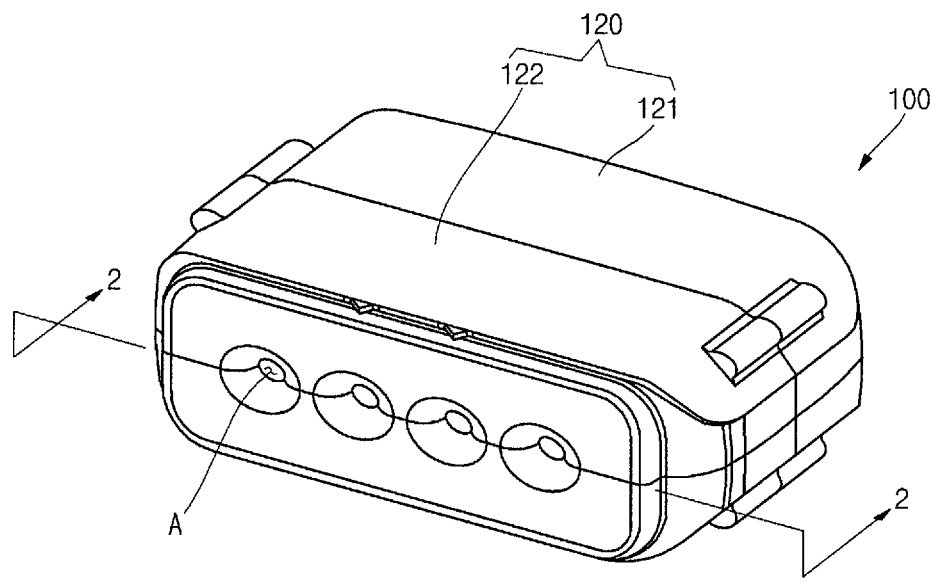
FIG. 1 is a perspective view of a battery pack according to an embodiment of the present invention.
Figure 2:
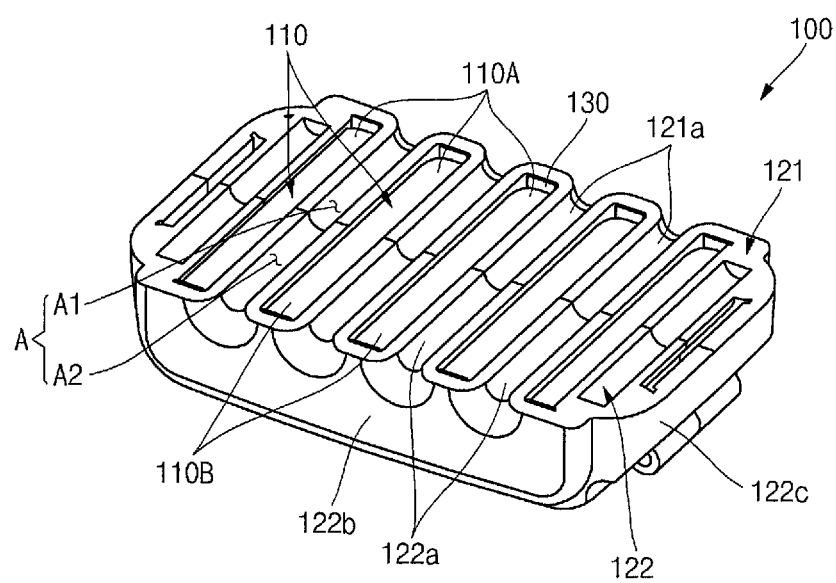
FIG. 2 is a perspective view, taken along the line 2-2 of FIG. 1.
Figure 3:
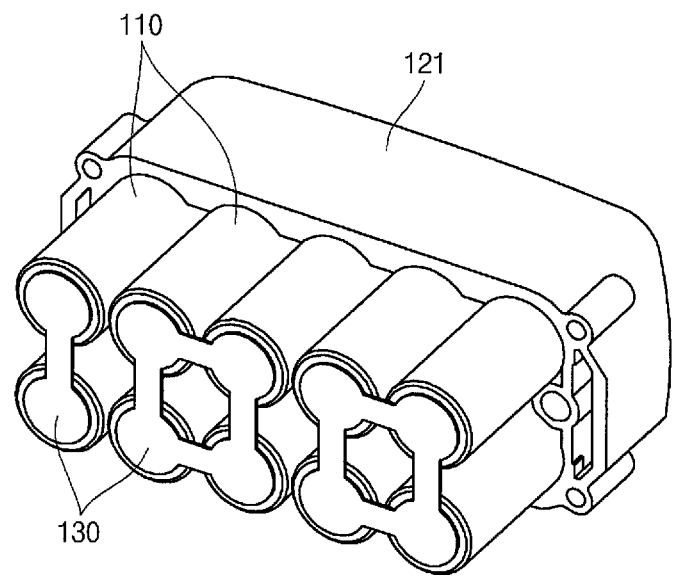
FIG. 3 is a perspective view illustrating a second battery case unassembled with respect to the battery pack of FIG. 1.
Figure 4:
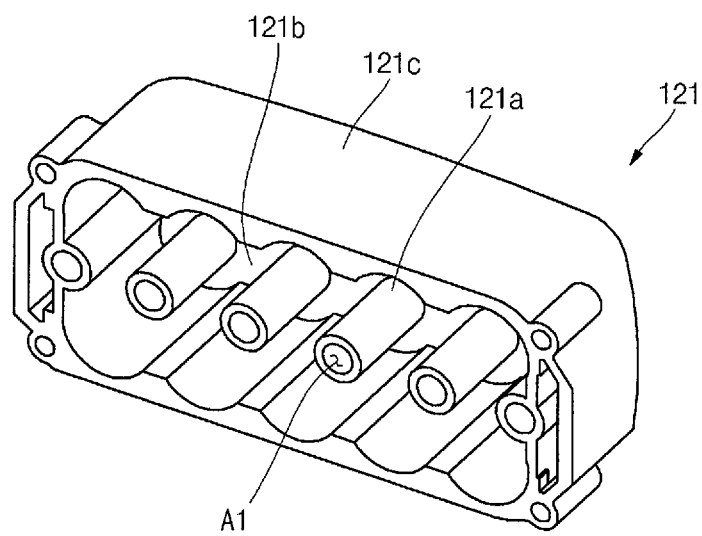
FIG. 4 is a perspective view of a first battery case in the battery pack shown in FIG. 1.

FIG. 1 is a perspective view of a battery pack according to an embodiment of the present invention, FIG. 2 is a perspective view, taken along the line 2-2 of FIG. 1, FIG. 3 is a perspective view illustrating a state in which a second battery case is not assembled in the battery pack of FIG. 1; and FIG. 4 is a perspective view of a first battery case in the battery pack shown in FIG. 1. A battery pack 100 according to the present invention will now be described with reference to FIGS. 1 to 4.

As shown in FIGS. 1 to 4, the battery pack 100 includes a plurality of battery cells 110 and a battery case 120 accommodating the plurality of battery cells 110. The battery pack 100 may further include electrode tabs 130 for connecting the plurality of battery cells 110 in series and in parallel, and external terminals electrically connected to the electrode tabs 130 and exposed to the outside of the battery case 120. The battery pack 100 is coupled to an electronic device or an electronic tool through the external terminals to supply power of the battery pack 100 to the electronic device or the electronic tool.

The plurality of battery cells 110 may be secondary batteries capable of charging and discharging. The plurality of battery cells 110 may be cylindrical lithium secondary batteries having energy density per unit weight. Each of the plurality of battery cells 110 has a first end or surface, a second end or surface opposite to the first surface and a side surface connecting the first surface and the second surface. In one embodiment, each battery cell 110 extends in a lengthwise direction from the first end to the second end. The plurality of battery cells 110 may be connected in series and in parallel through adjacent battery cells and the electrode tabs 130. As shown in the embodiment of FIG. 3, the plurality of battery cells 110 are illustrated as ten battery cells arranged within the battery case 120 in two rows, but the invention is not limited this number of battery cells.

The battery case 120 includes holder units 121a and 122a preventing the plurality of battery cells 110 accommodated therein from moving within the battery case 120 and fixing the plurality of battery cells 110. The battery case 120 includes a first battery case 121 and a second battery case 122. In addition, the holder units 121a and 122a include a first holder unit 121a provided in the first battery case 121 and a second holder unit 122a provided in the second battery case 122. The first battery case 121 and the second battery case 122 are combined with each other to accommodate the plurality of battery cells 110 and may be formed using an insulating material, such as plastic.

The first battery case 121 surrounds one side 110A of the lengthwise direction of each of the plurality of battery cells 110. In other words, the plurality of battery cells 110 are mounted in the first battery case 121 such that the one side 110A is received in an internal space of the first battery case 121. The one side 110A of each of the plurality of battery cells 110 is electrically connected in series and in parallel by the electrode tabs 130. The first battery case 121 includes a bottom surface 121b and a side surface 121c extending from an edge of the bottom surface 121b in the lengthwise direction of each of the plurality of battery cells 110. The side surface 121c may include a plurality of battery receiving units shaped of recessed circumferences shaped to correspond to the side surfaces of the battery cells 110 so as to receive the plurality of battery cells 110.

In addition, the first battery case 121 includes the first holder unit 121a protruding from the bottom surface 121b in the lengthwise direction of each of the plurality of battery cells 110. The first battery case 121 may be integrally formed by casting.

The first holder unit 121a is shaped of a cylindrical pipe having a passageway A1 that is configured to accommodate an air stream or other cooling material. In one embodiment, the passageway A1 of the first holder unit 121a is formed in the bottom surface 121b of the first battery case 121 as well. In other words, the passageway A1 of the first holder unit 121a is a through-hole penetrating from an end of the first holder unit 121a to the bottom surface 121b of the first battery case 121.

In one embodiment, the first holder unit 121a is brought into contact with side surfaces of four adjacent battery cells 110. In other words, the plurality of battery cells 110 are fixed within the first battery case 121 by the side surface 121c of the first battery case 121 and the first holder unit 121a. In FIGS. 1 to 4, four first holder units 121a are illustrated which, as configured in this embodiment, applies to a battery case 120 accommodating ten battery cells 110. As will be appreciated, the number and arrangement of first holder units 121a may vary according to the number and arrangement of the battery cells 110 accommodated in the battery case 120.

The end of the first holder unit 121a may be positioned on the same plane as the end of the side surface 121c of the first battery case 121. In other words, the first holder unit 121a and the side surface 121c of the first battery case 121 may have substantially the same height.

The second battery case 122 surrounds the other side 110B of the lengthwise direction of each of the plurality of battery cells 110. The second battery case 122 surrounding the other side 110B of the lengthwise direction of each of the plurality of battery cells 110 is combined with the first battery case 121 surrounding the one side 110A of the lengthwise direction of each of the plurality of battery cells 110, thereby accommodating the plurality of battery cells 110 therein. The other side 110B of the plurality of battery cells 110 accommodated within the second battery case 122 is electrically connected in series and in parallel by the electrode tabs 130.

The second battery case 122 includes a bottom surface 122b and a side surface 122c extending from an edge of the bottom surface 122b in the lengthwise direction of each of the plurality of battery cells 110.

In addition, the second battery case 122 includes the second holder unit 122a protruding from the bottom surface 122b in the lengthwise direction of each of the plurality of battery cells 110. The second battery case 122 may be integrally formed by casting. The second battery case 122 may have the same shape as or be a mirror image of the first battery case 121.

The second holder unit 122a is shaped of a cylindrical pipe having an air passageway A2. In one embodiment, the passageway A2 of the second holder unit 122a is formed in the bottom surface 122b of the second battery case 122 as well. In other words, the passageway A2 of the second holder unit 122a is a through-hole penetrating from an end of the second holder unit 122a to the bottom surface 122b of the second battery case 122.

The second holder unit 122a is brought into contact with side surfaces of four adjacent battery cells 110 arranged in two rows. In one embodiment, there are an equal number of second holder units 122a formed on the bottom surface 122b of the second battery case 122 and first holder units 121 formed in the first battery case 121, and the first and second holder units face each other. The end of the second holder unit 122a may be positioned on the same plane as the end of the side surface 122c of the second battery case 122. In other words, the second holder unit 122a and the side surface 122c of the second battery case 122 may have the same height.

The first battery case 121 and the second battery case 122 may be combined with each other using a coupling unit such that an end of the side surface 121c of the first battery case 121 and an end of the side surface 122c of the second battery case 122 are brought into contact with each other. In one embodiment, the end of the first holder unit 121a and the end of the second holder unit 122a are also brought into contact with each other to then be coupled. The coupling unit may include bolts and nuts, but is not limited thereto.

If the first battery case 121 and the second battery case 122 are combined with each other, the air passageway A1 in the first holder unit 121a and the air passageway A2 in the second holder unit 122a may be positioned on the same line. In other words, the ends of the first holder unit 121a and the second holder unit 122a are coupled to each other, so that external air may move through the air passageways A between the bottom surface 121b of the first battery case 121 and the bottom surface 122b of the second battery case 122.

In the battery pack 100, since the external air can move through the air passageways A of the holder units 121a and 121b provided in the battery case 120, the plurality of battery cells 110 accommodated in the battery case 120 can be efficiently cooled.

Figure 5:
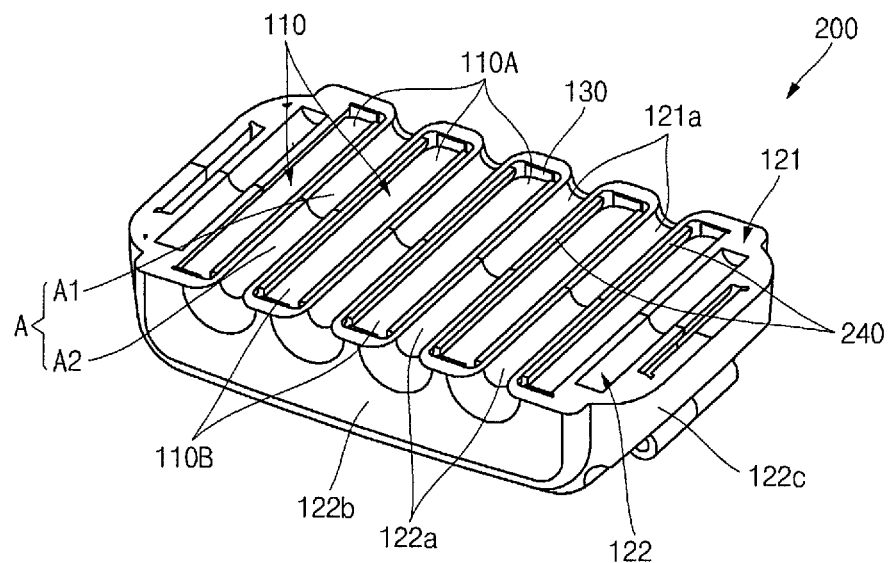
FIG. 5 is a perspective view of a battery pack according to another embodiment of the present invention, taken along a lengthwise direction of battery cells.
Figure 6:
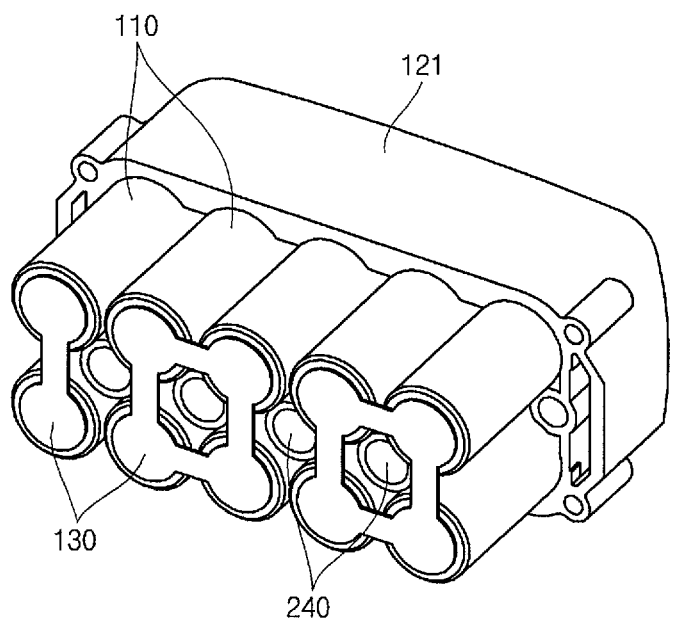
FIG. 6 is a perspective view illustrating a second battery case unassembled with respect to the battery pack of FIG. 5.

FIG. 5 is a perspective view of a battery pack according to another embodiment of the present invention, taken along a lengthwise direction of battery cells, and FIG. 6 is a perspective view illustrating a state in which a second battery case is not assembled in the battery pack of FIG. 5.

As illustrated in FIGS. 5 and 6, the battery pack 200 includes a plurality of battery cells 110 and a battery case 120 accommodating the plurality of battery cells 110. The battery pack 200 may further include electrode tabs 130 for connecting the plurality of battery cells 110 in series and in parallel, and external terminals electrically connected to the electrode tabs 130 and exposed to the outside of the battery case 120. The battery pack 200 is coupled to an electronic device or an electronic tool through the external terminals to supply power of the battery pack 200 to the electronic device or the electronic tool. In addition, in order to increase cooling efficiency of the battery case 120, the battery pack 200 may further include a thermally conductive pipe 240 surrounding holder units 121a and 122a of the battery case 120.

The plurality of battery cells 110, the battery case 120 and the electrode tabs 130 of the battery pack 200 are the same as those of the battery pack 100 shown in FIGS. 1 to 4. Therefore, the following description of the battery pack 200 will focus on a thermally conductive pipe 240, which is one difference between the battery pack 200 and the battery pack 100.

The thermally conductive pipe 240 surrounds the first holder unit 121a of the first battery case 121 and the second holder unit 122a of the second battery case 122.

In other words, the thermally conductive pipe 240 is mounted between the first battery case 121 and the second battery case 122 so as to surround the first holder unit 121a and the second holder unit 122a. The thermally conductive pipe 240 may be shaped as a circular pipe having an inner diameter that is substantially the same as an outer diameter of each of the holder units 121a and 122a. The thermally conductive pipe 240 is mounted in the first battery case 121 to surround the first holder unit 121a of the first battery case 121, and the second holder unit 122a of the second battery case 122 is then inserted into the thermally conductive pipe 240, to then be mounted between the first battery case 121 and the second battery case 122.

The thermally conductive pipe 240 may have a height that is substantially equal to a lengthwise height of each of the plurality of battery cells 110. In one embodiment, a height of the thermally conductive pipe 240 may be substantially equal to a sum of a height of the first holder unit 121a and a height of the second holder unit 122a, thereby surrounding both of the first holder unit 121a and the second holder unit 122a. The thermally conductive pipe 240 surrounding the holder units 121a and 122a is brought into contact with side surfaces of the plurality of battery cells 110. In other words, the thermally conductive pipe 240 is positioned between the holder units 121a and 122a and the plurality of battery cells 110.

The thermally conductive pipe 240 may be a highly thermally conductive pipe, for example, an aluminum pipe.

Since the thermally conductive pipe 240 has high heat conductivity, the efficiency of cooling plurality of battery cells 110 can be further increased by external air moving through the air passageways A of the holder units 121a and 122a.

Figure 7:
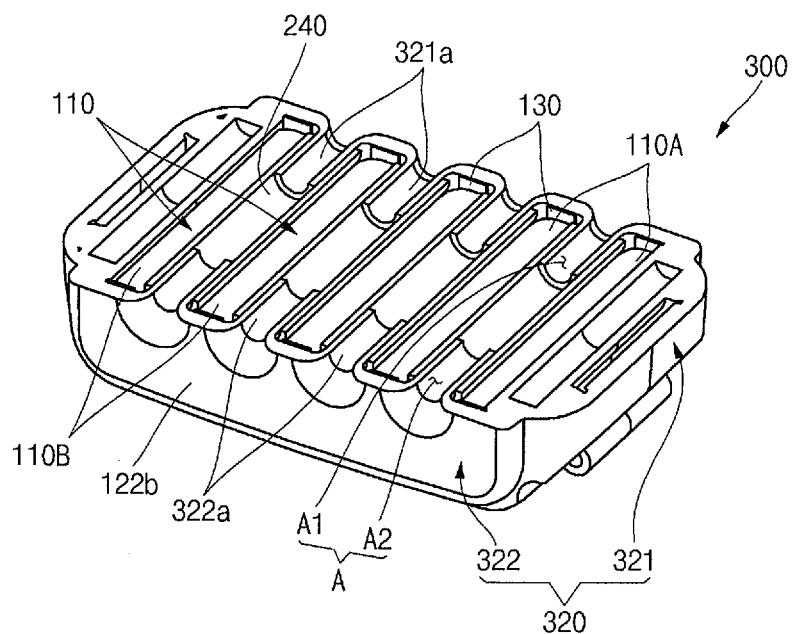
FIG. 7 is a perspective view of a battery pack according to another embodiment of the present invention, taken along a lengthwise direction of battery cells.
Figure 8:
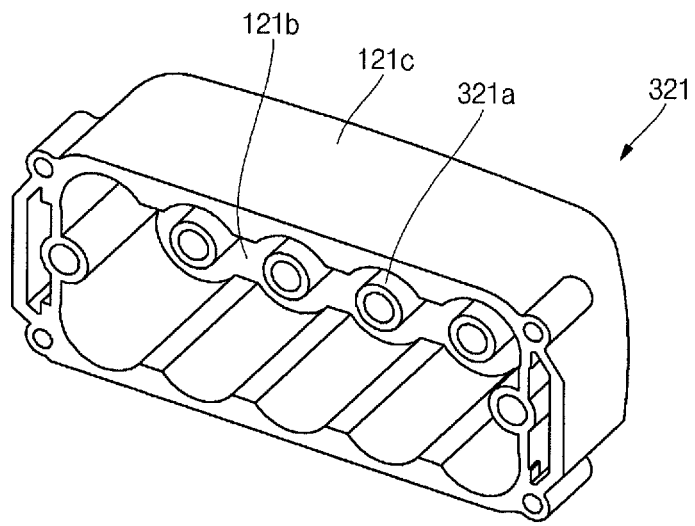
FIG. 8 is a perspective view of a first battery case in the battery pack shown in FIG. 1.

FIG. 7 is a perspective view of a battery pack according to another embodiment of the present invention, taken along a lengthwise direction of battery cells, is illustrated, and FIG. 8 is a perspective view of a first battery case in the battery pack shown in FIG. 1.

As illustrated in FIGS. 7 and 8, the battery pack 300 includes a plurality of battery cells 110 and a battery case 320 accommodating the plurality of battery cells 110. The battery pack 300 may further include electrode tabs 130 for connecting the plurality of battery cells 110 in series and in parallel, and external terminals electrically connected to the electrode tabs 130 and exposed to the outside of the battery case 120. The battery pack 300 is coupled to an electronic device or an electronic tool through the external terminals to supply power of the battery pack 300 to the electronic device or the electronic tool. In addition, in order to increase cooling efficiency of the battery case 320, the battery pack 300 may further include a thermally conductive pipe 240 surrounding holder units 321a and 322a of the battery case 320.

The plurality of battery cells 110, the electrode tabs 130 and the thermally conductive pipe 240 of the battery pack 300 are the same as those of the battery pack 200 shown in FIGS. 5 and 6. Therefore, the following description of the battery pack 300 will focus on the battery case 320, which is different from the battery pack 200.

The battery case 320 includes holder units 321a and 322a preventing the plurality of battery cells 110 accommodated therein from moving within the battery case 320 and fixing the plurality of battery cells 110. The battery case 320 includes a first battery case 321 and a second battery case 322. In addition, the holder units 321a and 322a include a first holder unit 321a provided in the first battery case 321 and a second holder unit 322a provided in the second battery case 322. The first battery case 321 and the second battery case 322 are combined with each other to accommodate the plurality of battery cells 110 and may be formed using an insulating material, such as plastic.

The first battery case 321 surrounds one side 110A of the lengthwise direction of each of the plurality of battery cells 110. In other words, the plurality of battery cells 110 are mounted in the first battery case 321 such that the one side 110A is received in an internal space of the first battery case 321. The one side 110A of each of the plurality of battery cells 110 is electrically connected in series and in parallel by the electrode tabs 130. The first battery case 321 includes a bottom surface 121b and a side surface 121c extending from an edge of the bottom surface 121b in the lengthwise direction of each of the plurality of battery cells 110. The side surface 121c may include a plurality of battery receiving units shaped of recessed circumferences shaped to correspond to the side surfaces of the battery cells 110 so as to accommodate the plurality of battery cells 110.

In addition, the first battery case 321 includes a first holder unit 321a protruding from the bottom surface 121b in the lengthwise direction of each of the plurality of battery cells 110. The first battery case 321 may be integrally formed by casting.

The first holder unit 321a is shaped as a cylindrical pipe having an air passageway A1. In one embodiment, the passageway A1 of the first holder unit 321a is formed in the bottom surface 121b of the first battery case 321 as well. In other words, the passageway A1 of the first holder unit 321a is a through-hole penetrating from an end of the first holder unit 321a to the bottom surface 121b of the first battery case 321 to allow a cooling fluid such as air to pass entirely through the case.

The end of the first holder unit 321a is positioned to be closer to the bottom surface 121b than the end of the side surface 121c of the first battery case 321. In other words, the first holder unit 321a has a height less than a height of the side surface 121c of the first battery case 321.

The second battery case 322 surrounds the other side 110B of the lengthwise direction of each of the plurality of battery cells 110. The second battery case 322 surrounding the other side 110B of the lengthwise direction of each of the plurality of battery cells 110 is combined with the first battery case 321 surrounding the one side 110A of the lengthwise direction of each of the plurality of battery cells 110, thereby accommodating the plurality of battery cells 110 therein. The other side 110B of the plurality of battery cells 110 accommodated within the second battery case 322 is electrically connected by the electrode tabs 130.

The second battery case 322 includes a bottom surface 122b and a side surface 122c extending from an edge of the bottom surface 122b in the lengthwise direction of each of the plurality of battery cells 110. In addition, the second battery case 322 includes the second holder unit 322a protruding from the bottom surface 122b in the lengthwise direction of each of the plurality of battery cells 110. The second battery case 322 may be integrally formed by casting. The second battery case 322 may have the same shape as or may be a mirror image of the first battery case 321.

The second holder unit 322a is shaped of a cylindrical pipe having an air passageway A2. In one embodiment, the passageway A2 of the second holder unit 322a is formed in the bottom surface 122b of the second battery case 322 as well. In other words, the passageway A2 of the first holder unit 121a is a through-hole penetrating from an end of the second holder unit 322a to the bottom surface 122b of the second battery case 322.

The end of the second holder unit 322a is positioned to be closer to the bottom surface 122b of the second battery case 322 than the end of the side surface 122c of the second battery case 322. In other words, the second holder unit 322a has a height less than a height of the side surface 122c of the second battery case 322.

The first battery case 321 and the second battery case 322 may be combined with each other using a coupling unit such that the end of the side surface 121c of the first battery case 321 and the end of the side surface 122c of the second battery case 322 are brought into contact with each other. In one embodiment, the end of the first holder unit 321a and the end of the second holder unit 322a face each other and are spaced from each other. The first holder unit 321a and the second holder unit 322a are surrounded by the thermally conductive pipe 240. The air passageway A1 of the first holder unit 321a and the air passageway A2 of the second holder unit 322a are connected to each other by the thermally conductive pipe 240 to then be integrally formed as the air passageways A. In other words, the first holder unit 321a and the second holder unit 322a are connected to each other by the thermally conductive pipe 240 so as to have the air passageways A, thereby allowing external air to move between the bottom surface 121b of the first battery case 321 and the bottom surface 122b of the second battery case 322. The thermally conductive pipe 240 is exposed to the outside through a space between the end of the first holder unit 321a and the end of the second holder unit 322a.

As described above, in the battery pack 300, since the thermally conductive pipe 240 having high heat conductivity making contact with the plurality of battery cells 110 is exposed to the outside of the battery case 320 through the air passageways A, the efficiency of cooling the plurality of battery cells 110 can be further increased by the external air.

Although the battery pack according to exemplary embodiments of the present invention has been described in detail hereinabove, it should be understood that many variations and modifications of the basic inventive concept herein described, which may appear to those skilled in the art, will still fall within the spirit and scope of the exemplary embodiments of the present invention as defined by the appended claims.

What is claimed is:

1. A battery pack comprising:
   a plurality of battery cells, each of the battery cells extending in a lengthwise direction between a first end and a second end; and
   a battery case accommodating the plurality of battery cells,
   wherein the battery case includes a holder unit protruding in the lengthwise direction of the plurality of battery cells and fixing the plurality of battery cells within the case; and
   a metal pipe surrounding an outer periphery of the holder unit wherein the metal pipe and the battery case are made from different materials.

2. The battery pack of claim 1, wherein the battery case comprises:
   a first battery case surrounding a first portion of each of the plurality of battery cells in the lengthwise direction; and
   a second battery case surrounding a second portion opposite to the first portion of each of the plurality of battery cells in the lengthwise direction, wherein the second battery case and the first battery case are coupled together.

3. The battery pack of claim 2, wherein the holder unit comprises:
   a first holder unit protruding from the first battery case in the lengthwise direction of each of the plurality of battery cells; and
   a second holder unit protruding from the second battery case in the lengthwise direction of each of the plurality of battery cells.

4. The battery pack of claim 3, wherein the first holder unit and the second holder unit comprise a pipe having a passageway.

5. The battery pack of claim 4, wherein an end of the first holder unit and an end of the second holder unit contact each other.

6. The battery pack of claim 1, wherein an end of the first holder unit and an end of the second holder unit are spaced from each other so that the metal pipe is exposed outside of the battery case.

7. The battery pack of claim 1, wherein the metal pipe comprises an aluminum pipe.

8. The battery pack of claim 1, wherein the metal pipe contacts adjacent ones of the battery cells.

9. The battery pack of claim 1, wherein the plurality of battery cells are oriented within the battery case in rows.

10. The battery pack of claim 9, wherein the holder unit protrudes next to four adjacent ones of the battery cells.

11. The battery pack of claim 10, wherein the holder unit contacts four adjacent ones of the battery cells.

12. The battery pack of claim 1, wherein the holder unit comprises a circular pipe having a passageway and is integral as a single piece with the battery case.

13. The battery pack of claim 1, further comprising electrode tabs accommodated within the battery case and electrically connecting the plurality of battery cells in series.

14. The battery pack of claim 1, wherein the metal pipe defines a passageway within the holder unit.

15. The battery pack of claim 1, wherein the metal pipe comprises aluminum and the battery case comprises plastic.

16. A battery pack comprising:
- a plurality of battery cells, each of the battery cells extending in a lengthwise direction between a first end and a second end; and
- a battery case accommodating the plurality of battery cells, wherein the battery case comprises:
  - a first battery case surrounding a first portion of each of the plurality of battery cells in the lengthwise direction; and
  - a second battery case surrounding a second portion opposite to the first portion of each of the plurality of battery cells in the lengthwise direction, wherein the second battery case and the first battery case are coupled together;
- wherein the battery case includes a holder unit protruding in the lengthwise direction of the plurality of battery cells and fixing the plurality of battery cells within the case, wherein the holder unit comprises a first holder unit protruding from the first battery case and a second holder unit protruding from the second battery case, wherein the first holder unit and the second holder unit comprise a pipe having a passageway, and wherein an end of the first holder unit and an end of the second holder unit contact each other; and
- a thermally conductive pipe surrounding an outer periphery of the holder unit wherein the thermally conductive pipe and the battery case are made from different materials.

* * * * *